Feb. 29, 1944.    E. F. STEINERT    2,342,764
TRANSFORMER POWER UNIT
Filed Oct. 18, 1941    2 Sheets-Sheet 1
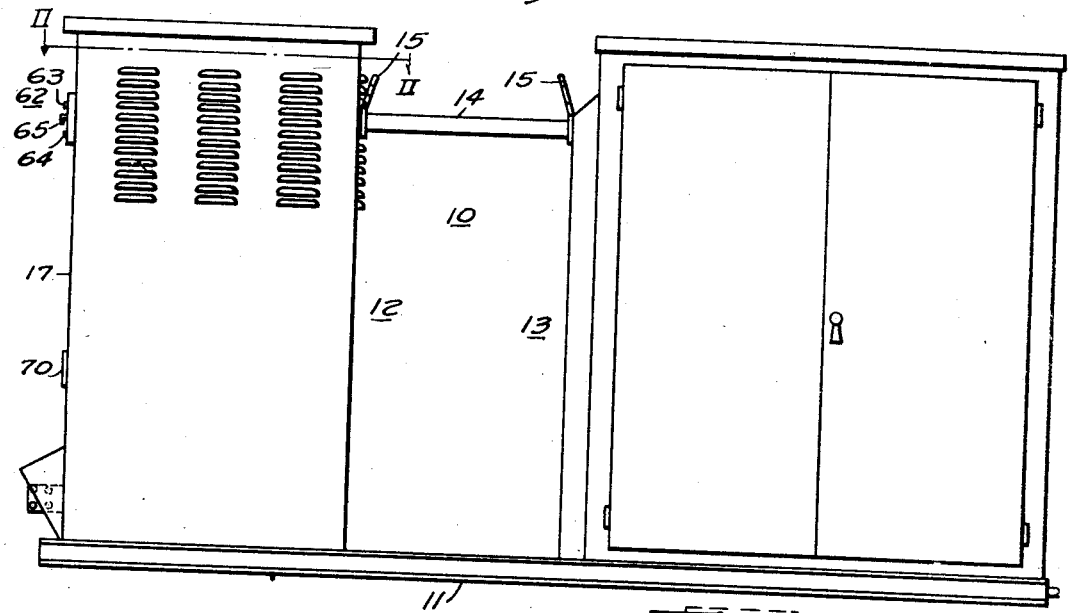
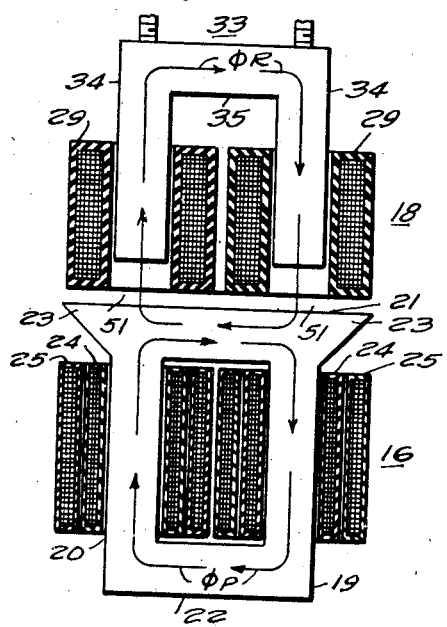
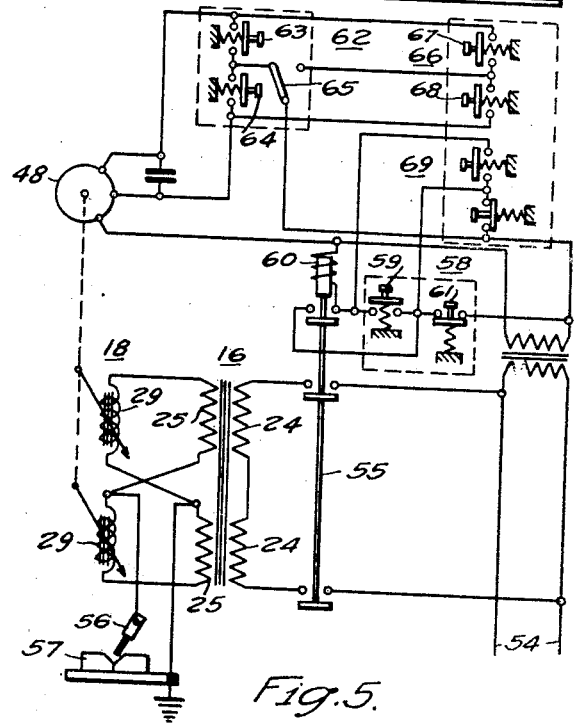
WITNESSES:
E. A. McCloskey
F. V. Giolma
INVENTOR
Emil F. Steinert.
BY
J. M. Crawford
ATTORNEY Feb. 29, 1944.  E. F. STEINERT  2,342,764
TRANSFORMER POWER UNIT
Filed Oct. 18, 1941  2 Sheets-Sheet 2

WITNESSES:  INVENTOR
Emil F. Steinert.
BY
ATTORNEY

Patented Feb. 29, 1944

2,342,764

UNITED STATES PATENT OFFICE 2,342,764

TRANSFORMER POWER UNIT

Emil F. Steinert, Sharon, Pa., assignor to Westinghouse Electric & Manufacturing Company, East Pittsburgh, Pa., a corporation of Pennsylvania Application October 18, 1941, Serial No. 415,588

9 Claims. (Cl. 171—119)

My invention relates generally to power units, and it has reference in particular to alternating current transformer power units and the transformer-reactor unit thereof suitable for use in arc welding systems and the like.

Generally stated, it is an object of my invention to provide an alternating current transformer power unit which is simple and inexpensive to manufacture, and which is efficient and reliable in operation.

Another object of my invention is to provide a transformer-reactor unit having a plurality of pairs of primary and secondary windings on a common magnetic core, a reactor winding associated with each secondary winding, and a movable magnetic shunt member common to the reactor windings associated with a portion of the transformer core.

A more specific object of my invention is to provide a transformer power unit having a common base structure with a transformer reactor unit adjacent one end and a control cabinet for the transformer reactor unit adjacent the other end and with a brace therebetween remotely positioned from the base structure.

A further object of my invention is to provide for supporting a movable magnetic shunt member by adjusting means supported on a resiliently mounted frame and provide a driving connection to the adjusting means from a motor mounted independently of the resiliently mounted frame.

Still another object of my invention is to provide the transformer core of a transformer-reactor unit with flared end portions for cooperating with a substantially U-shaped movable shunt member associated with the reactor windings of the unit.

It is also an object of my invention to provide a transformer power unit having a transformer with a relatively high voltage primary winding and a primary control cabinet mounted on a common frame in spaced relation.

A still further object of the invention is to provide a compact heavy duty transformer-reactor unit having a transformer core with serially connected primary windings on spaced leg portions thereof for connection to a relatively high voltage source, secondary windings associated with the primary windings connected in parallel circuit relation, a reactor winding connected in series circuit with each secondary winding and positioned above the transformer core, and a movable magnetic shunt member having depending leg portions positioned within the reactor windings cooperative with the upper end portion of the transformer core to provide a variable reluctance magnetic circuit for the reactor windings.

Other objects will in part be obvious, and will in part be explained hereinafter.

In practicing my invention a simple and inexpensive alternating current transformer power unit may be provided which is compact and relatively easy to handle. A transformer-reactor unit may be mounted at one end of a common base structure comprising a transformer core having serially related primary windings positioned on opposite legs thereof for connection to a relatively high voltage source. Secondary windings associated with each of the primary windings may be connected in parallel circuit relation for supplying welding current to a welding circuit. Stationary reactor windings may be positioned above the transformer core and connected in series circuit relation with each of the secondary windings. A common movable magnetic shunt member having spaced dependent leg portions positioned within the reactor windings may be supported by suitable adjusting means resiliently mounted on the frame of the unit. A control cabinet may be mounted at the other end of the base structure to house primary control means controlling the connections of the primary windings to a relatively high voltage source. The transformer reactor unit and control-cabinet may be mechanically connected adjacent the upper ends thereof by means of a brace positioned therebetween to facilitate lifting of the unit.

For a more complete understanding of the nature and scope of my invention reference may be had to the following detailed description which should be read in connection with the accompanying drawings in which:

Figure 1 is a side elevational view of a transformer power unit embodying the principal features of the invention;

Fig. 4 is a schematic view of the transformer-reactor unit showing the arrangement of the magnetic circuits and the transformer and reactor windings; and Fig. 5 is a schematic diagram of a welding system embodying the principal features of the invention.

Figure 2:
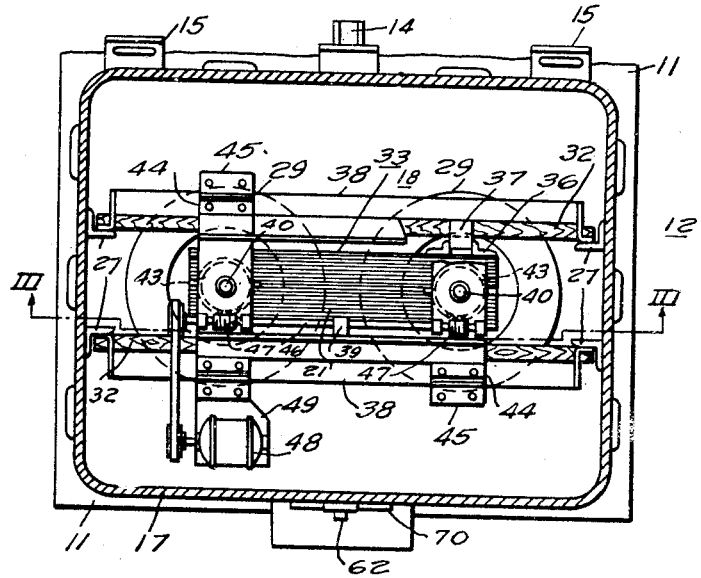
Fig. 2 is an enlarged sectional view taken along the line II—II of Fig. 1.

Referring to Fig. 1, the reference numeral 10 may denote generally an alternating current transformer power unit comprising a common base structure 11 having a transformer-reactor unit denoted generally by the numeral 12 mounted thereon adjacent one end and a control cabinet denoted generally by the numeral 13 mounted thereon adjacent the other end in spaced relation to the transformer-reactor unit. Suitable means such as the brace 14 may be provided between the control cabinet and the transformer-reactor unit adjacent the upper end thereof so as to provide a substantially rigid integral structure which may be lifted by means of lifting eyes 15 connected to the transformer-reactor unit and the control cabinet. It is to be understood, however, that the transformer-reactor unit and control apparatus may be enclosed by a common cabinet or casing if desired.

Figure 3:
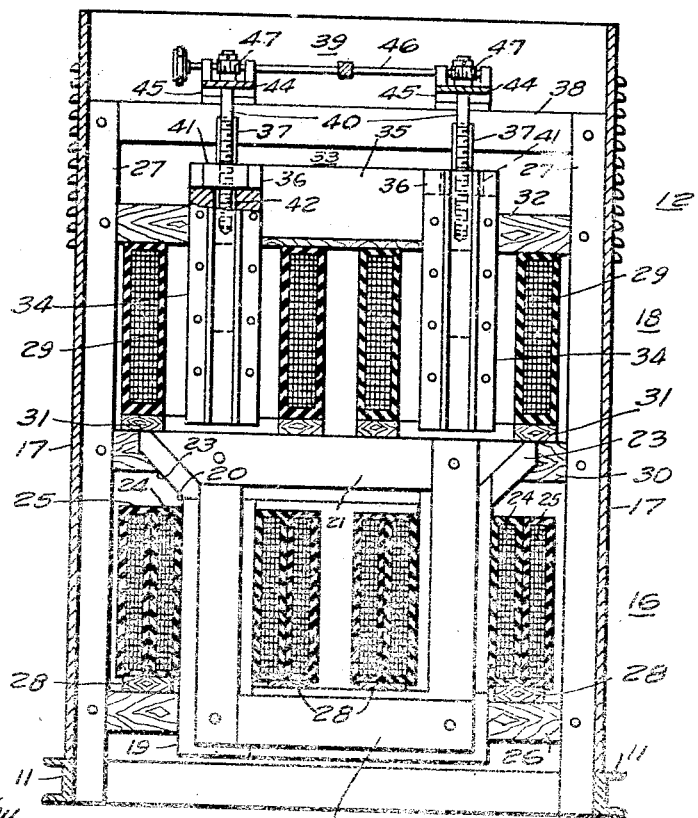
Fig. 3 is a sectional view taken along the line III—III of Fig. 2.

Referring to Figs. 2 and 3 of the drawings it will be seen that the transformer-reactor unit 12 may comprise generally a transformer 16 positioned in the lower portion of the casing 17 of the unit, and a reactor 18 positioned substantially immediately above the transformer.

The transformer 16 may comprise a substantially rectangular core member 19 having a pair of spaced leg portions 20 connected at the upper and lower ends by end portions 21 and 22, respectively. The leg portions 20 may be of cruciform section, and the upper end portion 21 may be provided with endwise projecting or outwardly flaring portions 23. The projecting portions may, for example, be generally triangular, making the end portion 21 longer at the upper edge. Primary windings 24 may be positioned on the opposite leg portions 20 and disposed to be connected in series circuit relation for connection to a relatively high voltage source. Secondary windings 25 may be positioned about the primary windings and connected in parallel circuit relation for connection to a welding circuit. The primary and secondary windings may be supported by the transverse support members 26, which may be connected to vertical frame members 27 of the transformer-reactor unit and provided with means such as the pressure pads 28, which engage the lower surfaces of the primary and secondary windings at spaced intervals.

Suitable reactor windings 29 may be positioned above the primary and secondary windings adjacent the upper end portions of the core member 19 for connection in series circuit relation with the secondary windings 25. The reactor windings may be supported in any suitable manner, being, for example, positioned between intermediate support members 30 having pressure pads 31 for engaging the lower surfaces of the reactor windings, and upper support members 32 on the upper side of the reactor windings connected to the frame members 27.

Suitable means may be provided for varying the impedances of the reactor windings 29 such as, for example, the movable magnetic shunt member 33 which may comprise spaced dependent leg portions 34 positioned within the reactor windings 29 and connected at the upper ends by a transverse portion 35. Suitable guides may be provided on the depending leg portions such as, for example, the angle members 36, which may be disposed to engage fixed guide members 37 secured at the lower ends to the upper support members 32 and at the upper ends to cross support members 38.

In this instance the movable magnetic shunt member 33 is supported by an adjusting and supporting mechanism denoted generally by the numeral 39. This mechanism may comprise a pair of rotatable shaft members 40 threaded adjacent the lower ends thereof to engage nuts 41 secured in recesses 42 in the dependent leg portions of the movable shunt member. The shaft members 40 may be provided with gears 43 adjacent the upper ends thereof and rotatably supported by means of brackets 44 resiliently mounted on the cross support members 38 by means of suitable rubber shear mounting members 45. A longitudinal shaft 46, having worm gears 47 in driving engagement with the gears 43, may be provided for rotating the shaft members 40 to raise or lower the magnetic shunt member 33. The shaft 46 may be driven in any suitable manner, being, for example, driven by a motor 48 mounted on a bracket 49 secured to the cross support member 38.

Referring to Fig. 4, it will be seen that the core member 19 provides a closed magnetic circuit for the primary and secondary windings 24 and 25 on the opposite legs thereof. The reactor windings 29 which are positioned substantially directly above the primary and secondary windings and substantially immediately adjacent the upper surface of the end portion 21 of the core member 19 may be so connected in series circuit relation with the secondary windings 25 of the transformer 16 that the magnetic flux produced thereby and indicated by the arrows $\phi R$ is in such a direction as to oppose the magnetic flux produced by the transformer windings and indicated by the arrows $\phi P$. The upper end portion 21 of the transformer core member 19 thus serves as a common path for the transformer and reactor fluxes. The outwardly projecting or flared end portions 23 of the core member which extend substantially beyond the outer portions of the movable magnetic shunt member 33 in the plane of the core and shunt member minimize the leakage of the magnetic flux produced by the reactor windings in the air gaps 51 between the dependent leg portion 34 of the shunt member and the upper portion 21 of the core member 19.

Referring to Fig. 5, which represents schematically a welding system embodying the principal features of the invention, it will be seen that the primary windings 24 of the transformer 16 may be connected to the relatively high voltage source 54 by means of a primary switch 55 which may be located in the control cabinet 13. The secondary windings 25 of the transformer may be connected in parallel circuit relation for supplying welding current to a welding circuit including an electrode 56 and work 57 upon which a welding operation is to be performed. The reactor windings 29 may be connected in series circuit relation with their respective secondary windings for varying the welding current. Suitable control means may be provided for controlling the operation of the primary switch 55, such as, for example, the push button station 58 which may comprise a "start" push button 59 for connecting the operating winding 60 of the primary switch 55 to the source and a "stop" push button 61 for disconnecting the operating winding 60 from the source. The push button station 58 may be, for example, positioned in the control cabinet 13 so that the connections of the primary windings of the transformer-reactor unit to the source may be readily controlled by the operator. A suitable push button station 62 may be provided having an "increase" button 63 and a "decrease" button 64 for controlling the operation of the motor 48 to provide for varying the output of the transformer-reactor power unit. A selector switch 65 may be provided therewith, which may be operated to the "on" position for operation of the output control at the welding unit and to a "remote" position for operation of the output by means of a remote push-button station 66 having an "increase" button 67 and a decrease button 68. A remote "off" and "on"

station 69 may also be provided, connections of the remote stations being made to a control terminal block located under a cover plate 70 in the transformer-reactor unit housing.

From the above description and the accompanying drawings, it will be apparent that I have provided a transformer power unit including a transformer-reactor unit suitable for use in arc welding systems which is of simple construction and is relatively inexpensive to manufacture. By utilizing a construction wherein a plurality of pairs of primary and secondary windings are arranged on different legs of the transformer core and the reactor windings are provided with a common magnetic shunt member which utilizes a portion of the transformer core for completing the magnetic circuit of the reactor, a compact and efficient transformer-reactor power unit is obtained capable of supplying relatively high welding currents and utilizing a minimum of space. By utilizing serially connected primary windings designed for connection to a relatively high voltage source, the size of the transformer may be kept to a minimum. The primary control relay and push-button station provide a safe and easy method of controlling the energization of the transformer without exposing the operator to any high voltage circuits.

I claim as my invention:

1. A transformer-reactor unit comprising, a closed magnetic core having a plurality of legs, associated primary and secondary windings positioned on said legs, a reactor winding connected to each secondary winding positioned above the magnetic core, and a common magnetic shunt member having dependent leg portions positioned within the reactor windings movably supported relative to the magnetic core.

2. A transformer-reactor unit comprising, a magnetic core member having a pair of spaced legs connected by end portions, a pair of primary windings and associated secondary windings positioned on the spaced legs and connected to produce additive magnetic fluxes in the magnetic core member, a movable magnetic shunt member comprising an end member and a pair of spaced dependent legs having the ends thereof adjacent one of the end portions, and a reactor winding positioned about each leg of the shunt member connected in series with one of the secondary windings to produce a flux in the end portion adjacent the shunt legs additive with respect to the transformer flux.

3. A transformer-reactor unit comprising, a transformer core having spaced legs having associated primary and secondary windings thereon connected at the ends to provide a closed magnetic path, a reactor winding connected in series with each secondary winding positioned above the core, and a magnetic shunt member having depending legs positioned within the reactor windings movable relative to the core for varying the impedance of the secondary circuit, said transformer core being provided with endwise projections adjacent the upper end extending to the outer edge of the reactor winding.

4. A transformer reactor unit comprising, a movable shunt member having dependent leg portions, a stationary reactor winding positioned about each leg portion, a pair of primary transformer windings positioned beneath and coaxial with the reactor windings, a secondary transformer winding associated with each primary winding connected with its associated reactor winding, and a closed transformer core having leg portions positioned within the primary and secondary windings connected by end portions, the end portion adjacent the shunt member being provided with flared ends to reduce the leakage flux from the reactor windings.

5. An arc welding transformer-reactor unit comprising, a core type transformer having a pair of serially connected primary windings positioned on opposite legs of the core with associated secondary windings connected in parallel circuit relation, a substantially U-shaped movable shunt member having dependent leg portions positioned adjacent an end of the transformer, and a fixed reactor winding positioned about each leg of the shunt member connected in series circuit relation with a secondary winding of the transformer.

6. An arc welding transformer-reactor unit comprising, a structural frame, a transformer rigidly mounted in the frame with a magnetic core having spaced legs connected by end portions and provided with pairs of primary and secondary windings, a support resiliently mounted in the frame, a magnetic shunt member having spaced dependent legs associated with the upper end portion of the magnetic core, adjusting means mounted on the support for moving the shunt member relative to the magnetic core, and a reactor winding positioned about each leg of the shunt member connected in series circuit relation with one of the secondary windings.

7. A transformer-reactor comprising, a transformer having a magnetic core provided with a plurality of associated primary and secondary windings, a reactor winding connected in series circuit relation with each secondary winding, and a common magnetic reactor core having a leg portion movably positioned in each reactor winding, said leg portions being connected by a common end portion.

8. An arc welding transformer-reactor unit comprising, a transformer core having a plurality of pairs of inductively related primary and secondary windings, a magnetic reactor core member movably positioned adjacent a portion of the transformer core having a plurality of spaced legs extending toward said portion and connected at the ends remote therefrom by a common end portion, and a reactor winding connected in series circuit relation with a secondary winding of each pair on the transformer, said reactor winding being positioned about a leg of the reactor core member.

9. A reactor-transformer unit comprising, a transformer having a magnetic core with a plurality of pairs of inductively related primary and secondary windings, a magnetic reactor core having as many spaced legs extending toward the transformer core as there are pairs of primary and secondary windings, said legs being connected by a common end portion at the end remote from the transformer core, means adjustably positioning the reactor core relative to the transformer core, and a reactor winding positioned about each leg adjacent and in substantially fixed relation to the transformer core, and connected in series relation with a different one of the secondary windings.

EMIL F. STEINERT.